June 15, 1937.  A. P. STEINER  2,083,748
MACHINE TOOL CARRIAGE CONTROL
Filed Nov. 11, 1933  3 Sheets-Sheet 2
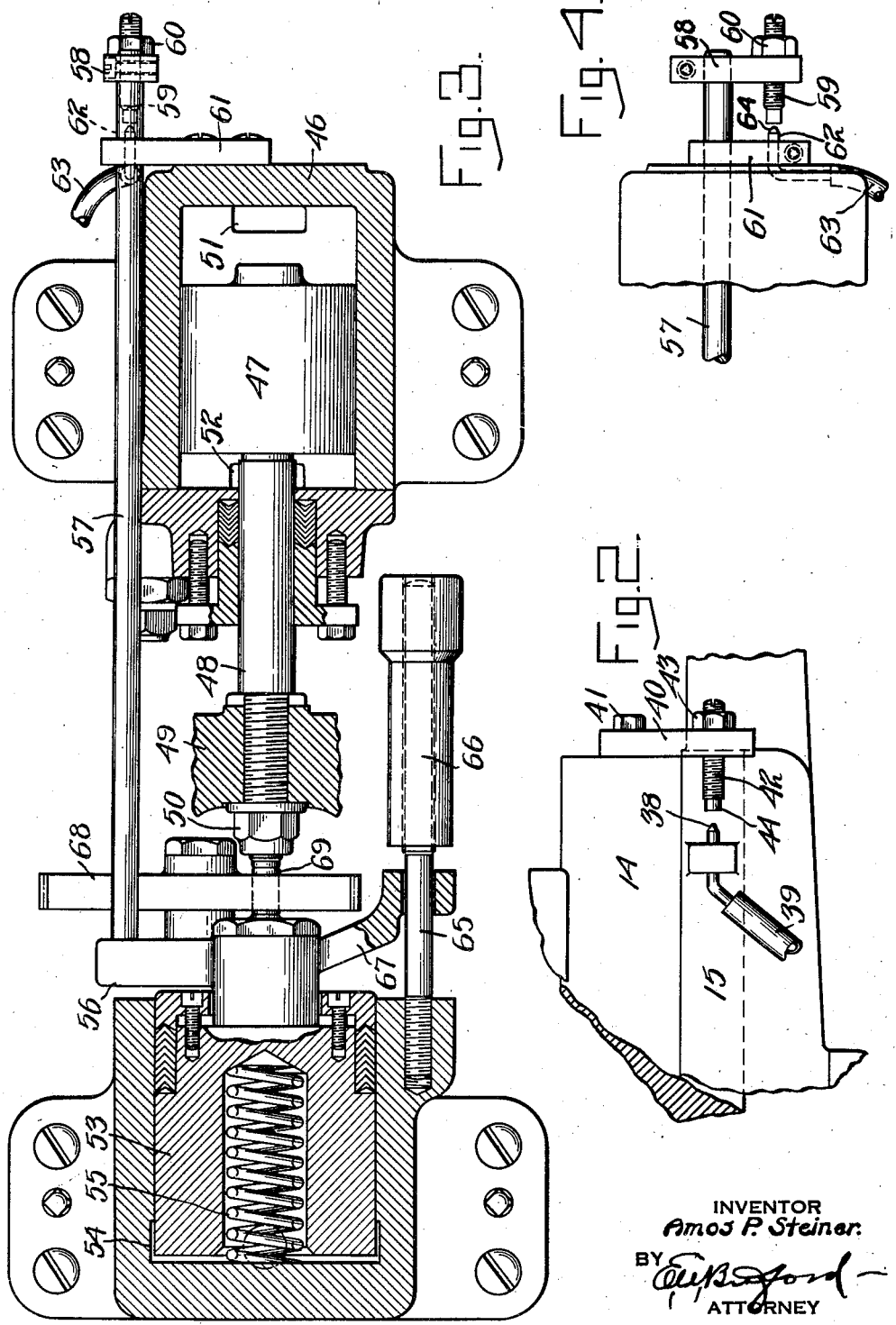
INVENTOR
*Amos P. Steiner.*
BY
ATTORNEY

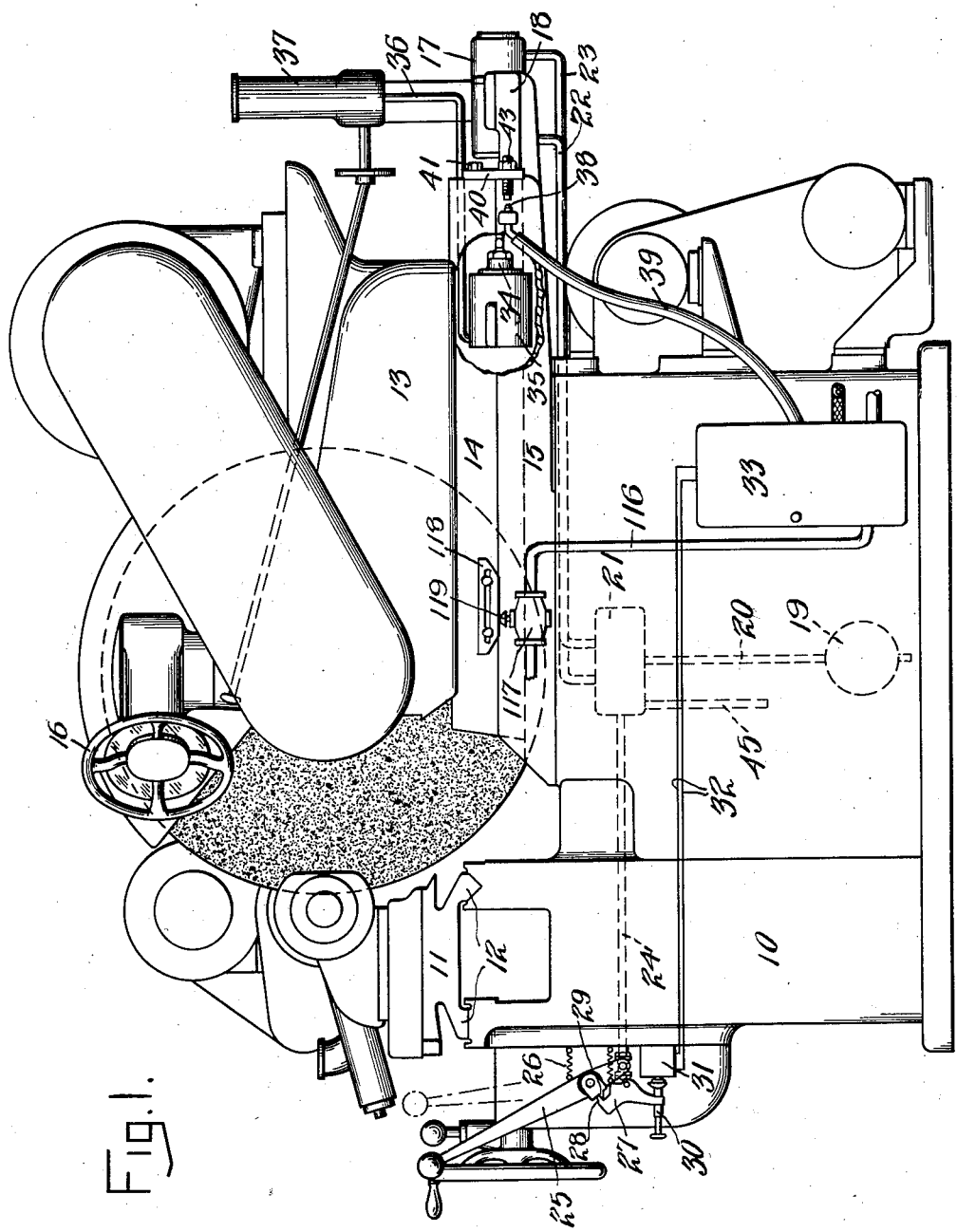

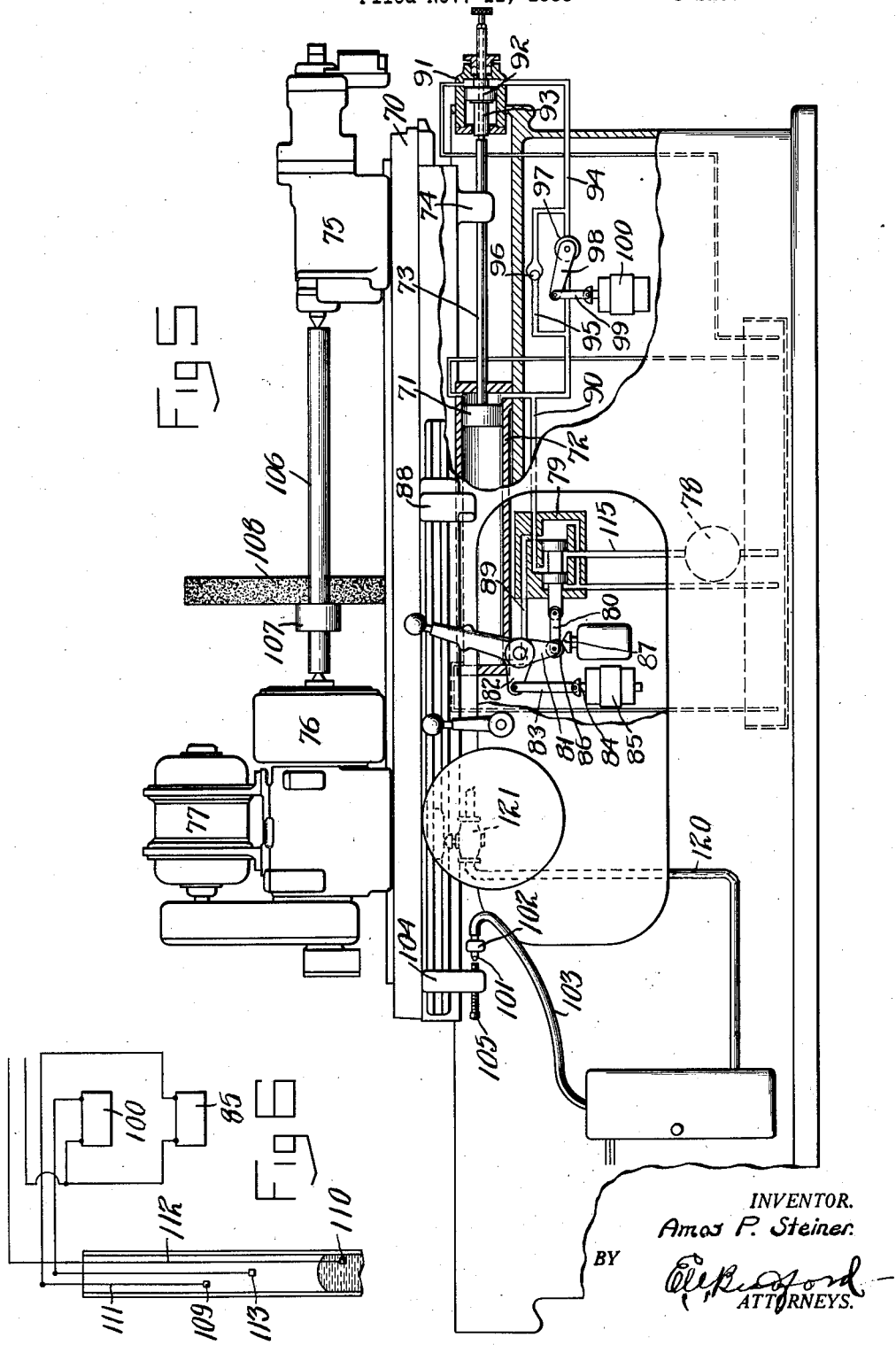

Patented June 15, 1937

2,083,748

UNITED STATES PATENT OFFICE 2,083,748

MACHINE TOOL CARRIAGE CONTROL

Amos P. Steiner, Waynesboro, Pa., assignor to Landis Tool Company, Waynesboro, Pa., a corporation of Pennsylvania Application November 11, 1933, Serial No. 697,653

9 Claims. (Cl. 51—95)

This invention relates to means for controlling the movements of the carriages of a grinding machine or other machine tool and its object is to provide a control system which may be adapted for limiting movement of the wheel support, the work carriage or other support and for controlling a plurality of devices in response to the position of these carriages or supports.

A further object is to provide means for sizing the work by controlling the position of the wheel base. Various mechanism on the machine may also be controlled such as the feed of the wheel base at a certain point, the flow of coolant, a work rest or any other mechanism which is to be co-ordinated with the wheel base movement.

Referring to the accompanying drawings, which are made a part hereof and on which similar reference characters indicate similar parts, Figure 1 is an end view in elevation of a grinding machine having my invention incorporated therein, Figure 2, a detail view of the pressure fluid controlling device shown on a larger scale than the showing in Figure 1, Figure 3, a longitudinal section of a modified form of control, Figure 4, a detail view showing an element of the control used in Figure 3, Figure 5, a front view in elevation of a grinding machine showing my invention adapted to control a work carriage, and Figure 6, a diagrammatic showing of the electric circuits and mercury tube.

In the drawings numeral 10 indicates the bed of a grinding machine having a work carriage 11 traversably mounted upon ways 12 upon the bed. A wheel base 13 is mounted upon a slider 14 which moves upon a sub-slide 15. The wheel base is manually adjustable upon the slider 14 by a conventional hand wheel 16 such as is well known in the grinding machine art. The wheel base slider 14 is adjustable on the sub-slide 15 by a hydraulic motor which will now be described. This consists of a cylinder 17 which is carried by a bracket 18 which bracket is rigidly secured to the bed of the machine, preferably being an extension of the sub-slide 15.

A piston in the cylinder 17 is connected by means of a suitable piston rod which latter element is attached to a bracket on the wheel base slider 14. The wheel base is moved toward and from the work by pressure fluid supplied to the cylinder 17 by means of a pump 19 which delivers fluid through a pressure fluid line 20, a reversing valve 21, and pipes 22 and 23, the direction of movement of the wheel base depending on the position of the reversing valve 21. The reversing valve is operated by means of a rod 24 which is pivotally attached to a reversing lever 25. A spring 26 attached to the reversing lever and to the machine bed tends to rotate the reversing lever in a clockwise direction to move the reversing valve to the left as shown in Figure 1 to deliver fluid through line 22 to the cylinder 17 so as to withdraw the wheel base. The reversing lever is held locked against the tension of the spring 26 by means of a latch 27 which has a hooked portion 28 engaging a lug 29 on the reversing lever. The free end of the latch 27 is engageable by a plunger 30 which is operated by a solenoid 31. The solenoid is energized through circuit 32 which circuit is closed by mechanism in a control box 33. With the reversing lever in the position shown in Figure 1 the parts are set for feeding the wheel base toward the work. This feeding movement will at first be relatively rapid, which movement will continue until some element on the slider engages a piston 34 of the feed control mechanism 35. This mechanism consists of a cylinder having a chamber connected by means of a fluid line 36 with a reservoir 37. The feed control cylinder and reservoir may be the same as that shown in my Patent 1,816,750. In brief the control device comprises a fluid reservoir from which fluid may flow freely through line 36 into the control cylinder. The return flow from the control cylinder back to the reservoir is limited by a needle valve, the speed of return of the fluid to the reservoir determining the speed of movement of the wheel base toward the work after the piston in cylinder 17 has engaged the abutting piston 34.

Means for controlling the forward movement of the wheel base and for reversing it consists of a fluid nozzle 38 which is secured to the bed of the machine. This nozzle is connected by a fluid conduit 39 with a control device 33. The control device 33 may be and preferably is that shown in the co-pending application of Harold E. Balsiger 598,498, filed March 12, 1932, now Patent 2,001,447 dated May 14, 1935. Air for operating the sizing device is supplied through pipe 116 from a source of air under constant pressure. The flow is controlled by a valve 117 operated by a cam 118 engaging a plunger 119. This prevents wasting the air when it is not being used.

A bracket 40 is secured upon the wheel base slide 14 by means of a screw 41. This bracket carries an adjustable screw 42 which is secured and locked in adjustable position by a lock nut 43. The surface 44 of this adjustable screw is movable into close proximity to the end of the fluid nozzle 38. Fluid, preferably air under pressure, is permitted to issue through the nozzle 38. When the surface 44 is withdrawn from close proximity to the end of the nozzle the air may issue freely from the jet. When the surface 44 is brought into very close proximity to the nozzle the flow of air from the nozzle is restricted. This builds up pressure and causes circuit through lines 32 to be closed to energize solenoid 31. This releases the latch and permits reversing lever 25 to reverse valve 21 and return wheel base to the rear.

In operation it will be seen that with the valve 21 in the position shown in Figure 1 the parts are set for moving the wheel base toward the work by hydraulic pressure delivered through the line 23 and exhausted through line 22, the exhaust passing out through a pipe 45. Movement of the wheel base will be rapid at first, its movement being slowed down when some element on the moving part engages the piston 34. Further feeding of the wheel base toward the work will be limited by the speed with which the entrapped liquid in the cylinder 35 may be forced up into reservoir 37. This is the grinding speed for the movement of the wheel base toward the work. When the surface 44 closely approaches the end of the nozzle 38 the escape of fluid through line 39 is restricted and pressure built up by this restriction causes circuit to be closed through line 32 which other mechanism already described causes a shifting of the reversing valve to return the wheel base to the rear.

If desired the control device 33 may be arranged to control other elements on the machine such as the cutting off of the flow of coolant, means for traversing the work carriage to position another portion of the work to be ground, also any other mechanism may be controlled which should operate in proper sequence with return of the wheel base.

In the embodiment of the invention just described the stationary fluid jet is mounted on the slide 15 on the bed of the machine. In the modified forms shown in Figures 3 and 4 there is a different arrangement. In Figure 3 the cylinder 46 is secured upon the bed of the machine preferably on a bracket extending from the subslide. A piston 47 operates within this cylinder this piston having a rod 48 which is connected to a bracket 49 on the wheel base slide, the piston being secured to the bracket by means of a nut 50. The piston 47 is operated by pressure fluid delivered to and exhausted from the cylinder through ports 51 and 52. Control for the wheel feed consists of the piston 53 which is operable in cylinder 54. A spring 55 is biased to move the piston outwardly. The piston 53 carries a bracket 56 to which is attached a shaft 57. The free end of this shaft carries a bracket 58 in which is adjustably carried a screw 59 which is locked in adjusted position by a nut 60. A bracket 61 secured on cylinder 46 has a fluid nozzle 62 secured therein and pressure fluid is supplied to the nozzle through a flexible tube 63. As in the case described above when the forward movement of the wheel base brings a surface 64 into close proximity with the nozzle 62 the flow of fluid from the nozzle is restricted. This restriction is utilized to control further movements of the wheel base and to effect its withdrawal and to operate such other mechanism as is supposed to be set in motion or the motion of which must be stopped when the wheel base has reached the limit of its forward travel. A pin 65 is screw threaded into the control cylinder 54. A nut 66 is adjustably carried on the pin 65. An arm 67 on the piston 53 is perforated to surround the pin 65 and by striking the inner end of the nut 66 limits the outward movement of the piston 53. The arm 56 carries a stud upon which is mounted a pinion 68. This pinion carries a plurality of pins of different lengths, one of which is shown at 69. These pins may be moved automatically into position in which they will be engaged by the end of the piston 48 and which in turn will engage the end of piston 53. The purpose of this is to limit the slow feed of the wheel base corresponding with work of different sizes.

In Figures 5 and 6 is shown a form of the invention adapted to control a work carriage. One purpose of applying this control to a work carriage is to facilitate grinding against a shoulder on the work. A work carriage 70 mounted upon the bed of the machine is traversed by means of a piston 71 operating in a cylinder 72 mounted in the bed of the machine. A piston rod 73 is connected to a lug 74 depending from the work carriage 70. The work carriage has mounted thereon a tail stock 75 and a head stock 76, the latter of which is rotated by means of a motor 77. Motive fluid for operating the work carriage is supplied by a pump 78 and fluid is controlled by a reversing valve 79. The reversing valve is connected by means of a link 80 to the lower end of a reversing lever 81. The reversing lever 81 has a lateral arm 82 which is connected by a link 83 to the armature 84 of a solenoid 85. The lower end of the reversing lever carries a roller 86 which rides over a V-shaped plunger 87, the plunger serving to throw the reversing lever to the extreme limit of movement after it has been partially moved in either direction. The arm 82 of the reversing lever is moved upwardly by a solenoid 85 to shift the valve to the left. The valve is moved in the other direction by dog 88. Fluid is supplied to the ends of the cylinder 72 through lines 89 and 90. Air is permitted to escape from the cylinder 72 thru vent lines at each end thereof. Mounted on the end of the base is a dash pot cylinder 91 having a piston 92 operable therein. A piston rod 93 on the piston extends out through the end of the cylinder 91 and is engageable by the end of the piston rod 73. Fluid is supplied to the dash pot from valve 79 and line 90 by means of a pipe 94 and a by-pass pipe 95 having therein a check valve 96. Fluid is returned from the dash pot through an adjustable throttle valve 97. This valve has an arm 98 attached thereto which is connected by a link 99 to a solenoid 100. A fluid nozzle 101 is mounted in a bracket 102 on the bed of the machine and fluid is supplied to the nozzle through a fluid conduit 103. The work carriage carries a lug 104 having an adjustable screw 105 positioned in axial alignment with the end of the nozzle 101. Air to said nozzle is supplied from pipe 120 controlled by valve 121. The nozzle 101 and its associated elements are similar to those shown in the co-pending application referred to. The arrangement is such that as the work carriage approaches the limit of its travel to the right the escape of fluid through the nozzle 101 is retarded and this causes the mercury level to rise in a control tube and this rise in level is caused to control further operations of the machine. Fluid also passes from line 90 thru line 95, check valve 96 and line 94 to the right hand end of cylinder 91 to reset piston 92 by moving same to the left. In the particular work piece 106 there is a shoulder portion 107 against which the grinding wheel 108 engages to grind the shaft up near the shoulder. It is desirable that the work be slowed down as it approaches the position at which the grinding wheel will engage the shoulder of the work. When the work carriage has approached the limit of its travel to the right, piston rod 73 engages the stem 93 on the dash pot piston 92. Further movement of the carriage will force the piston 92 to the right. Its rate of movement in this direction is limited by the valve 97 since oil must be forced out of the cylinder 91 through the pipe 94 into the pipe 90. As the carriage travels further to the right the screw 105 approaches the nozzle 101 to restrict the flow of air through the pipe 103. This restriction in the escape of air builds up pressure in the air line and this pressure is used to cause a rise in the mercury column to close circuit across contacts 110 and 113, first to energize solenoid 100. Through link 99 and lever 98 this partially closes valve 97 to restrict the flow of fluid from the dash pot 91. This slows down movement of the work carriage to the right so that shoulder 107 is brought very slowly into engagement with the rim of the grinding wheel. When the carriage has reached the desired limit of its travel to the right the screw 105 will have approached sufficiently near the nozzle 101 to further restrict the escape of air from the pipe 103. This will close circuit across contacts 109 and 110 to energize solenoid 85. When solenoid 85 is energized it pushes up on lever 82 to shift the reversing lever 81 to shift the reversing valve 79 to the left at which the fluid line 115 is open to fluid line 90 to admit pressure fluid to the right of piston 71 to move the work carriage to the left. Movement in this direction continues until a dog 88 on the work carriage shifts the reversing lever to the left to shift the valve to the right. From the foregoing description it will be apparent that the carriage is slowed down and then reversed without actually coming into engagement with any rigid element on the bed of the machine for screw 105 is never brought actually into engagement with the end of the nozzle 101.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. Means for controlling the forward position of a grinding wheel base comprising a nozzle adapted to be secured in fixed position on the machine, means for supplying fluid under constant pressure to said nozzle, means on said wheel base movable toward and from said nozzle, and means controlled by the restriction of the flow of fluid from said nozzle due to the nearness of approach of the element on the wheel base for controlling the reversing of the wheel base.

2. A grinding machine having a work support and a wheel support, a motor for moving said wheel support toward and from said work support, a valve in control of said motor, a lever for operating said valve, said lever being biased to a position at which the valve will be set to deliver fluid to withdraw the wheel support from the work support, a latch for holding said lever in a position to cause the wheel support to move toward the work support and pressure fluid means including a nozzle controlled by movement of said wheel support toward the work support for releasing said latch.

3. In a grinding machine of the kind described having a work support and a wheel support, a bracket mounted upon said wheel support, an abutting screw positioned in said bracket and movable therewith, a stationary bracket, a fluid nozzle mounted in said stationary bracket, a fluid line connected to said stationary bracket, said fluid line being in communication with fluid under a constant pressure, the escape of fluid from said nozzle being controlled by the distance between said abutting screw and said nozzle, and means controlled by the variation in escape of fluid for limiting forward position of the wheel support.

4. Means for controlling the finished grinding position of a wheel base comprising a fixed nozzle, a fluid connection to said nozzle, said connection being in communication with fluid under constant pressure, an abutment on said wheel support movable toward said nozzle to restrict the flow of fluid therefrom, and means controlled by restriction of the fluid flowing from the nozzle for controlling the forward movement of the wheel support.

5. Means for controlling the finished grinding position of a wheel base comprising a fixed nozzle, a fluid connection to said nozzle, said connection being in communication with fluid under constant pressure, an abutment on said wheel support movable toward said nozzle to restrict the flow of fluid therefrom, and means controlled by restriction of the fluid flowing from the nozzle for controlling the forward movement of the wheel support, and for operating a reversing valve to withdraw said wheel support from working position.

6. A machine of the kind described, having a base, a carriage movably mounted on said base, a nozzle in the path of said carriage, a supply of fluid under constant pressure for said nozzle and adapted to be discharged therefrom, movement of said carriage being effective to vary the discharge of fluid from said nozzle and means responsive to said variation in discharge from said nozzle to effect a change in the movement of said carriage.

7. In a machine of the kind described, a reciprocable carriage, pressure fluid means to move said carriage, a valve to determine the direction of movement of said carriage, fluid means separate from said moving means to oppose said carriage movement in one direction and connections from said reversing valve to said opposing fluid means to shift said opposing means to starting position when the carriage moves in the opposite direction.

8. A grinding machine having a movable carriage, means to move said carriage comprising a piston and cylinder, one of which is attached to said carriage, means to control said moving means comprising a nozzle, a supply of fluid under constant pressure for said nozzle and means movable toward and away from said nozzle in response to said moving means to vary the flow of fluid from said nozzle whereby to stop and reverse the movement of said moving means.

9. A grinding machine having a bed, a carriage movably mounted thereon, means for moving said carriage, means for controlling said moving means, a nozzle on one of said parts, an abutment on the other in alignment with said nozzle, a supply of fluid under constant pressure for said nozzle, relative movement between said abutment and said nozzle being effective to vary the flow of fluid from said nozzle, and means responsive to said variation in the flow of fluid for actuating said control means to stop and reverse the movement of said moving means.

AMOS P. STEINER.